Figure 1:
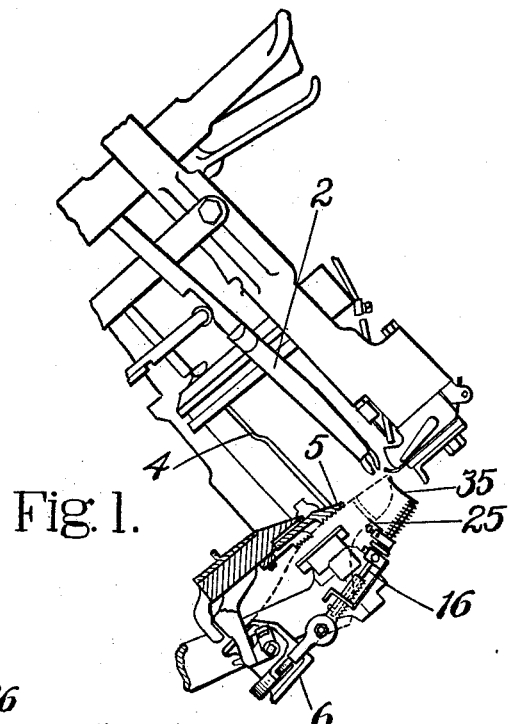

A. L. COOMBS.
TIP MEASURER FOR PULLING-OVER MACHINES.
APPLICATION FILED JUNE 8, 1912.

1,104,878.  Patented July 28, 1914.

WITNESSES.  INVENTOR.

THE NORRIS PETERS CO., PHOTO-LITHO., WASHINGTON, D. C.

UNITED STATES PATENT OFFICE.

ABRAM L. COOMBS, OF PHILADELPHIA, PENNSYLVANIA, ASSIGNOR TO UNITED SHOE MACHINERY COMPANY, OF PATERSON, NEW JERSEY, A CORPORATION OF NEW JERSEY.

TIP-MEASURER FOR PULLING-OVER MACHINES.

1,104,878.  Specification of Letters Patent.  Patented July 28, 1914.

Application filed June 8, 1912. Serial No. 702,487.

*To all whom it may concern:*

Be it known that I, ABRAM L. COOMBS, a citizen of the United States, residing at Philadelphia, in the county of Philadelphia and State of Pennsylvania, have invented certain Improvements in Tip-Measurers for Pulling-Over Machines, of which the following description, in connection with the accompanying drawings, is a specification, like reference characters on the drawings indicating like parts in the several figures.

This invention relates to tip measuring apparatus for pulling-over machines and has for its object to provide certain improvements in such measurers, for example, as that claimed in United States Letters Patent No. 1,030,763, granted June 25, 1912, on application of Orrell Ashton.

An important feature of this invention consists in a gage having a shoe engaging member adapted to extend transversely across the forepart of a shoe and means for supporting said member for lateral angular adjustment. One of the uses for which I desire a tip gage is in testing the right line position of a tip seam which extends in oblique angular relation to the median line of the shoe. On a straight last the tip seam is perpendicular to the median line but in a crooked last it is inclined toward one side of said line in a right shoe and toward the other side in a left shoe. When a tip seam is so inclined a gage which has a right-angular relation to the median line of the shoe is of little value because it is difficult for the operator to see at a glance, as he must be able to do if the gage is to be worth using, whether or not the seam is bowed or otherwise crooked. By this feature of my invention the range of utility of the gage is greatly widened. I prefer to locate the center for angular adjustment substantially at the rear end face of the heel of the last. In the gage of said patent the supporting point is in the heel rest of the pulling-over machine and the measurement is taken from the heel end of the shoe against which the rest abuts. This is desirable in some classes of work and on some styles of shoes. I have found, however, in practical experience with the gage that there are conditions under which it is preferable to measure from the toe end of the shoe as a workman does with a hand gaging tool. I have therefore, in accordance with a further feature of this invention, so modified the gage that it can be used to measure from the toe end of the shoe, and preferably so that the tip location can be determined, or be justified, from either end of the shoe alternatively. To this end I have extended the gage plate carrying arm beyond said plate and provided it with a toe end abutment between which and the plate there is provision for relative adjustment for tips of different lengths.

These and other features of the invention including certain details of construction and combinations of parts will now be described in connection with the accompanying drawings and then pointed out in the claims.

Figure 3:
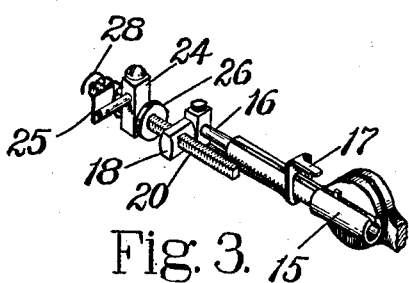
Figure 2:
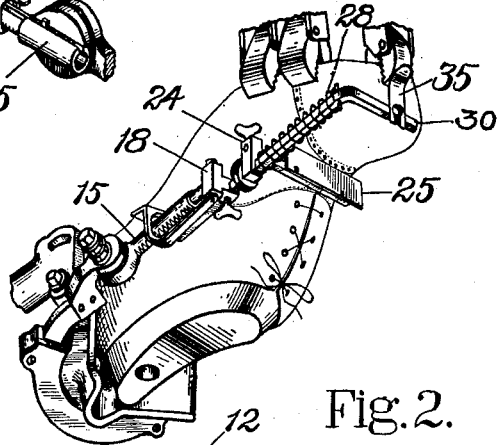
Figure 4:
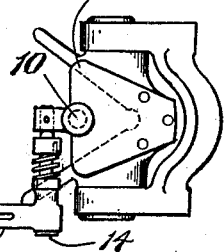

Figure 1 is a side elevation of so much of the pulling-over machine as is necessary to show, equipped with a gage embodying this invention. Fig. 2 is a perspective view of the gage in operative relation to a shoe. Fig. 3 shows a reverse view, and Fig. 4 shows a plan view to illustrate a specific provision for angular adjustment for crooked shoes.

It may be briefly explained that the machine comprises toe and side grippers 2 and 4 by which the upper is seized and pulled over the last which is rested against a shoe bottom abutment or sole rest 5 and that a forked heel rest 6 is mounted on a movable carrier by which the rest is yieldingly advanced from a retracted position into engagement with the heel end of the shoe after the grippers have tensioned the upper enough to hold the last firmly against the sole rest. The heel rest can swing laterally to adapt itself automatically to the lateral position of the shoe heel when the forked faces of the rest meet the shoe. The machine further includes a tip straightening hand lever and connections to the side grippers, substantially as shown in United States Letters Patent No. 663,777, granted Dec. 11, 1900, on application of Ronald F. McFeely, to move one side gripper forwardly and the other backwardly for straightening the tip seam if that seam does not occupy the desired angular relation to the median line of the last. Other adjusting means are also provided for causing the grippers to shift the upper transversely of the last and for drawing the upper forwardly and slacking it backwardly to desired position on the last. The nature and construction of these adjusting mechanisms it is not necessary to consider for the purpose of understanding this invention but descriptions thereof will be found in said prior patent mentioned and in the various patents covering improvements upon and developments from the original machine.

To the heel rest I have connected the tip gage by a pivot stud 10 which extends substantially perpendicular to the plane of the shoe bottom and is located substantially at the rear end face of the heel, being carried by the cap plate 12 that covers the upper end of the rest. The stud has a forwardly projecting block in which is clamped a lateral arm 14 on which, as a horizontal axis extending transversely of the shoe, the tubular rod 15 is mounted to turn. Free turning movement is restrained by friction produced by a spring acting against a washer between which and the headed end of arm 14 the rod 15 is pressed.

In the modified mounting shown in Figs. 1 and 2 the rod 15 is frictionally clamped to an arc shaped bar that slides endwise in a holder curved about a center located substantially at the same point as the pivot stud 10 is located. The tubular rod 15 telescopes the small rod 16 that carries a spring latch 17 engaging rod 15 to hold the two rods in lengthwise adjustment. On the end of rod 15 is a block 18 in which is adjustably held by a binding screw a threaded rod 20, which might equally well be made as an extension of rod 15 itself. On this threaded rod 20 is carried the gage plate 25 being supported by a block 24 which can slide along the rod and is adjusted forwardly by a milled nut 26 against a spring 28. The front end of the spring abuts against a lateral abutment or support 30 formed by a bent portion of the rod 20 and extending in the same direction as the gage plate, that is, transversely under the shoe in the pulling-over machine as in Figs. 1 and 2. The support 30 is under or adjacent to the toe end of the shoe and carries the toe abutment 35 which projects upwardly into position to engage the shoe as in Figs. 1 and 2. The toe abutment is held by a binding screw and slot, as shown in Fig. 2, to permit vertical adjustment and to allow it to be turned down to an inoperative position when it is not desired to measure the tip from the toe of the shoe.

It will be understood that in the contemplated use of the invention the gage will be advanced by the heel rest automatically from its retracted position in time relation with the upper pulling movements of the grippers and that when the machine has come to rest for inspection and adjustment of the upper the operator will position the rest by turning it upwardly about the stud 14 and swinging it laterally, as may be suitable for the particular right or left shoe, about the stud 10, or in the curved guideway as in Fig. 2. The adjustment of rod members 15, 16 having been made to position the toe abutment for the length of the shoe and the adjustment of the gage plate 25 having been made for the length of the tip required for the style and size of the shoe, the operator compares the lengthwise and angular position of the tip seam of the shoe in the machine with that indicated for it by the gage plate and then makes by the usual tip straightening lever, or otherwise, the corrections required to locate the tip seam where it should be. Before restarting the machine the gage is turned down again to a position where it will be out of the way of the other parts of the machine and where it will not interfere with the insertion and removal of shoes. In this use the length of the tip is measured from the toe end of the shoe, the length of the tip being the distance between the gage plate 25 and the abutment 35, and the next shoe to be pulled over will be required to have the same tip measurement, the adjustment requiring to be changed only for different sizes or different styles of shoes. If position of the tip with reference to the heel end face of the shoe is the standard used in the specifications for a case of shoes the toe abutment 35 may be turned around and down to an inoperative position and the gage plate can be set with reference to a scale that can be marked on rod 15.

Having explained the nature of this invention and described how it may be used, I claim as new and desire to secure by Letters Patent of the United States:—

1. A pulling-over machine having, in combination, upper pulling grippers, a heel end rest for the shoe and a tip gage having a shoe engaging edge extending transversely across the forepart of the shoe, said gage being supported for lateral angular adjustment about a center located substantially at the rear end face of the heel to adapt it for right and left crooked lasts.

2. A pulling-over machine having, in combination, means for pulling an upper over a last, a tip gage pivotally supported in the rear of the pulling means and having a plate extending across the shoe adjustable laterally about an axis substantially perpendicular to the plane of the shoe bottom.

3. A pulling-over machine having, in combination, means for pulling an upper over a last, a heel rest movable laterally to support the heel ends of right and left crooked shoes the foreparts of which are positioned similarly in the pulling-over means, and a tip measuring gage movable laterally with said heel rest and comprising a gage plate extending across the forepart of the shoe and adjustable angularly about an axis substantially perpendicular to the plane of the shoe bottom.

4. A pulling-over machine having a tip gage including a toe end abutment and a tip seam plate, a heel rest and a supporting connection from the heel rest to said gage members.

5. A pulling-over machine having a tip gage including a toe end abutment and a tip seam plate, a heel rest and a supporting connection from the heel rest to said gage members, said connection permitting angular lateral adjustment of the gage members relatively to the heel rest.

6. A pulling-over machine having a tip gage including a toe end abutment and a tip length indicating scale extending lengthwise of the shoe, a heel rest and a supporting connection from the heel rest to said gage permitting angular movement of the gage laterally of the shoe and also toward and from the shoe into and out of operative position.

7. A pulling-over machine having, in combination, means for resting a shoe heel, and a rod supported on the heel resting means for movement into an operative position extending lengthwise of the shoe, a transversely extending tip seam gage and a toe abutment carried on the rod and adjustable relatively to the heel rest.

8. A pulling-over machine having, in combination, means for resting a shoe heel, and a rod connected with the rest and extensible along the side of the shoe, a transversely extending tip seam gage and a toe abutment carried on the rod, said gage and abutment being relatively adjustable.

9. A pulling-over machine having, in combination, means for resting a shoe heel, and a gage comprising a rod connected with the rest and extensible along the side of the shoe, a toe end abutment on the rod and a gage plate adjustable on the rod from and toward the abutment.

10. A pulling-over machine having, in combination, means for resting a shoe, and a gage comprising a measuring rod connected with the rest and extending along the side of the shoe, a toe abutment on the rod, and a gage plate extending laterally from the rod across the shoe at the tip seam and adjustable relatively to the toe abutment.

11. A pulling-over machine having, in combination, means for pulling an upper over a last, and a tip gage comprising a gage plate arranged to extend transversely across the shoe adjacent to the tip seam and supported for angular adjustment about an axis extending substantially perpendicular to the plane of the shoe bottom, and a toe end abutment connected with the gage plate with provision for relative adjustment for different lengths of tips.

12. A pulling-over machine having, in combination, means for pulling an upper over a last, and a tip gage comprising the rod 16, the block 18 carried thereon, the rod 20 adjustable in said block, the toe abutment 35 carried by said rod, and the gage plate 25 extending transversely across the shoe and mounted on the rod 20 adjustably with reference to the toe end abutment.

In testimony whereof I have signed my name to this specification in the presence of two subscribing witnesses.

ABRAM L. COOMBS.

Witnesses:
 H. E. COLE,
 HANS WENIGER.

Copies of this patent may be obtained for five cents each, by addressing the "Commissioner of Patents, Washington, D. C."